Aug. 28, 1945.  B. W. H. COCKS  2,383,468

FLIGHT LEVEL INDICATING INSTRUMENT

Filed Sept. 18, 1940

Inventor:
Basil William Henry Cocks
By
Williams, Bradbury & Hinkle
Attys.

Patented Aug. 28, 1945

2,383,468

UNITED STATES PATENT OFFICE 2,383,468

FLIGHT LEVEL INDICATING INSTRUMENT

Basil William Henry Cocks, Middle Park, Victoria, Australia

Application September 18, 1940, Serial No. 357,200
In Australia October 13, 1939

8 Claims. (Cl. 73—178)

This invention has reference to a means for indicating the flight level of air-craft to avoid collision when flying in a predetermined direction and has been devised to provide a method and apparatus positive in operation and convenient and simple in use.

Hitherto it has been the accepted practice for air-craft, when flying in opposite directions between two points, to veer to the left or right depending on local regulations or to fly at respective odd and even thousand feet in order to avoid any possibility of collision whilst in mid-air. Furthermore, stipulated zones are provided for airmail planes within and along which zones private planes are not permitted to travel, with the result that such private planes have to make a detour to avoid the airmail route.

Other systems and means have been employed in an endeavour to avoid air-craft colliding in mid-air, such as charts or manually operated rotating tabulators, indicating different height zones in which the air-craft should be, when flying within a range between two directional points, but such charts have many disadvantages, as, with the use of same, the pilot has to make a mathematical calculation to obtain the correct result, after which he must consult both his compass and altimeter, furthermore, in order to facilitate calculation an appreciable gap must exist between the termination of the last zone on one chart and the commencement of the first zone on the succeeding chart, such gap being, for example, 400 feet, within which zone no provision is made for air-craft to be flown. This gap would occur every 4000 feet if the zones were arranged to provide a distance of 1800 feet between air-craft flying in opposite directions.

Such accepted practices as above mentioned apply in some countries, while other countries allocate flight levers above which private planes are not permitted to fly, in order to avoid same coming within the zone where airmail or commercial planes are operating, with the result that such private planes are often subjected to adverse weather coonditions which would be avoided if they were permitted to fly at a higher altitude.

The main object of the present invention is to provide means for incorporation in an air-craft, which, if correctly used, make it impossible for any one of a number of air-craft machines fitted with the said means, to collide in mid-air with any of the said machines irrespective of which direction the machines are flying.

With the above object in view the present invention consists in a directional flight level indicating instrument, the dial of which is graduated and marked with suitable figures in defined positions to indicate to the pilot at what altitude his air-craft must be flown or flying when travelling in any direction in order to avoid collision with other similarly equipped air-craft in mid-air at the same time and flying in any other direction, the said instrument having associated therewith either a north seeking needle, or a needle operated by variations in barometric pressures, or a combination of both types of needles, the graduations and figures on the dial varying according to the types or combination of needles used.

The invention is characterized by a north seeking needle having a surrounding dial graduated in degrees so as to indicate to the pilot the direction in which his air-craft is heading, the dial having also associated therewith a needle operable by variations in barometric pressures, the said latter needle being adapted to make one complete revolution over a predetermined altitude according to requirements, but preferably 2000 feet. Under such conditions, if the two needles are maintained in a superimposed position, two air-craft flying in opposite directions will be in horizontal planes separated by 1000 feet, while all other air-craft will be in varying horizontal planes according to the direction in which they are flying, under which conditions, the possibility of air-craft colliding in mid-air is avoided.

The invention may be applied to an instrument having a north seeking needle operating in conjunction with either a dial fixed in relation to the air-craft or an adjustable bezel adapted to be fixed in relation to the air-craft.

The invention may also be applied to a side reading instrument in which the dial floats and is controlled by a north seeking element, the said dial operating in conjunction with a lubber line fixed in relation to the air-craft.

Furthermore, if desired and convenient, the north seeking element may be located where desired in the air-craft and made to co-act with a remote controlled dial vertically or horizontally disposed on the instrument panel of the air-craft.

In any of the embodiments of the invention where a needle operable by variations in barometric pressures is used it will be appreciated that such barometrically controlled means must be adjusted to a fixed barometric pressure (preferably the average pressure taken over a period throughout the world), in order that instruments incorporating such a needle in all machines will operate in relationship to one another. Under such circumstances it would be necessary for safety purposes to incorporate an altimeter adapted to be adjusted to the barometric pressure prevailing in different localities. However, such a condition does not raise any difficulty in view of the fact that most air-craft machines at present carry two altimeters.

Other features of the invention will be described hereinafter with reference to the accompanying drawing in which.

It will be appreciated that the altimeter to be used in conjunction with the indicators herein described must be adjusted to a fixed barometric pressure (preferably the average pressure taken over a period throughout the world), in order that such indicators in all machines will operate in correct relationship to one another. Furthermore, in the indicators hereinafter described where means are incorporated and operable by variations in barometric pressures, such barometrically controlled means must also be similarly adjusted to a fixed barometric pressure.

Figure 1:
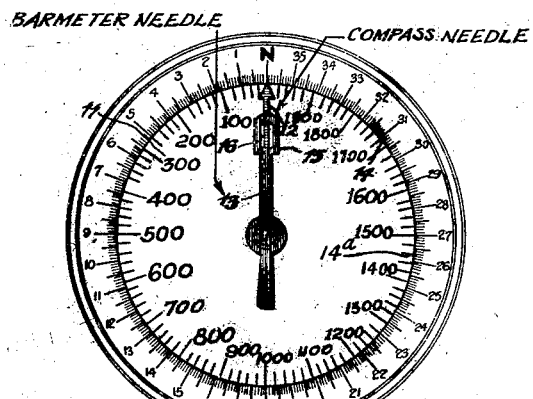
Figure 1 is a plan view of a dial of a horizontal form of direction level indicator having a north seeking needle and directional degree readings, and a co-acting needle operable by variations in barometric pressures.

In one form of carrying the invention into practical effect and referring to Figure 1 of the drawing, 11 represents the dial of a horizontal direction level indicator, such dial 11 having associated therewith a revolvable north seeking needle 12, and an independent revolvable needle 13 operable by variations in barometric pressures.

The circumference of the dial 11 is graduated in degrees as at 14 for the full 360°, and marked in an anti-clockwise manner from zero to 360°, in order that the north seeking needle 12 will indicate to the pilot the degrees in which his air-craft is heading or flying.

The barometrically operated needle 13 is arranged to rotate in an anti-clockwise direction when the air-craft is ascending, and to make one complete revolution over a height between two predetermined altitudes, depending on the clearance desired between two air-craft flying in opposite directions, for example, if 1000 feet clearance is desired between such opposing air-craft, the needle 13 would be arranged to make one complete revolution every 2000 feet altitude.

In operation when the air-craft is flying at the degrees as indicated by the needle 12, the pilot maintains the barometrically operated needle 13 in a superimposed position with the needle 12, thus ensuring that his air-craft is at all times located at the correct altitude to avoid collision with other air-craft in mid-air at the same time and flying in any other direction.

As before mentioned, the needle 13 is adjusted to a fixed barometric pressure, and to obtain the actual altitude at which the air-craft is flying, the altimeter adjusted to the barometric pressure prevailing in the locality where the air-craft is at the time, must be consulted.

Should it be necessary to fly in the same direction at a higher or lower altitude, the pilot must respectively ascend or descend in a spiral manner until the needle 13 makes one or more complete revolutions, both needles 12 and 13 being maintained in a superimposed position during the ascending or descending period to ensure that collision will not occur with other air-craft in mid-air at the same time and flying in other directions.

It will be appreciated that as long as the two needles 12 and 13 are maintained in a superimposed position it is impossible for an air-craft incorporating the indicator to collide with any other air-craft in mid-air at the same time and flying in any other direction, providing similar indicators are incorporated in such other air-craft.

In order to facilitate the needles 12 and 13 being maintained in co-relation to one another, the top needle 13 is provided with an enlarged end 15 having a cut-out 16 through which the needle 12 may be viewed when in correct relationship.

If desired the dial 11 may also have disposed in an anti-clockwise manner around and adjacent the entire circumference of the graduations 14, altitude graduations 14a, ranging, for example, from zero to 2000 feet, the zero reading of the said latter graduations coinciding with the due north or zero reading of the graduations 14, in order that the respective graduations are in correct relationship to one another.

It will be appreciated that where the needle 12 is remote controlled by a north seeking element, the said needle 12 may be arranged to rotate in a clockwise manner instead of anti-clockwise, under which condition, the graduated degree readings 14 would be marked also in a clockwise manner from zero to 360° and likewise the barometrically operated needle 13 would be arranged to rotate clockwise when the air-craft is ascending.

Figure 2:
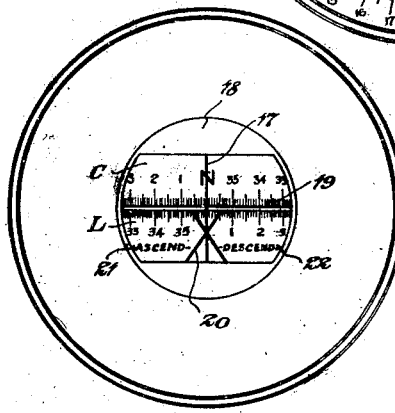
Figure 2 is an elevation of the face of a side reading direction level indicator having dual dials operable for obtaining a similar result to the indicator illustrated in Figure 1, the respective dials being controlled by a north seeking element and barometrically operable means.

In a modified form of construction, Figure 2 represents a side reading indicator having dual ribbon dials operable for obtaining a similar result to the indicator described with reference to Figure 1, only instead of employing the fixed graduated dial 11 and movable needles 12 and 13, the side reading indicator employs revolvable graduated ribbon dials C and L which correspond to the respective revolvable needles 12 and 13 of the indicator illustrated in Figure 1, the said dials C and L co-acting with a lubber line 17 fixed on the face 18 of the indicator.

The ribbon dial C is revolvable around a vertical axis and is operated by a north seeking element (not shown) in a similar manner to an existing side reading air-craft compass, said dial C being graduated as at 19 in degrees in a clockwise manner for the full 360° also in a similar manner to existing air-craft compasses, so that when the air-craft turns to the right the lubber line 17 moves in a clockwise direction around the dial C.

The barometrically operated dial L is arranged to make one complete revolution over a predetermined height as does the needle 13 of the indicator described with reference to Figure 1, for example, every 2000 feet, thereby giving a clearance of 1000 feet between two air-craft flying in opposite directions. The dial L is arranged to rotate in a clockwise direction when the air-craft is ascending and in an anti-clockwise direction on descending.

The adjacently disposed and axially operated revolvable ribbon dial L is independently operable by variations in barometric pressures in a similar manner to the needle 13 of the indicator illustrated in Figure 1, the said ribbon dial L having a marking 20 of a suitable nature, for example, an X on the vertical face of its periphery and also degree readings arranged oppositely to those on dial C to permit the said dial L to be maintained in correct relationship to the dial C for flying at the correct altitude when travelling in any direction. Means are also provided where required on the dial L, such as the words "Ascend" and "Descend" with respective associated arrows 21 and 22 to indicate to the pilot whether to ascend or descend to an altitude in order to bring the marking 20 or corresponding degree readings on the dials C and L into superimposed alignment with the lubber line 17.

In operation when the aircraft is flying in any direction as indicated on the dial C by the respective graduation 19 in alignment with the lubber line 17, the corresponding degree reading on the dial L must be maintained in alignment with the lubber line 17, under which condition the aircraft will be located at the correct altitude to avoid collision with other aircraft in midair flying in a different direction in the same locality at the same time. For example, if the aircraft is flying north on a magnetic bearing the zero or N line on the dial C will coincide with the lubber line 17, and the pilot should maintain an altitude at which the dial L will have its zero line or marking 20 in alignment with the lubber line. If the flying course is changed so that the compass reading of 15° on dial C is in alignment with the lubber line 17, then the pilot must cause the aircraft to descend until the reading of 15° on dial L is in alignment with the lubber line 17. This will bring the aircraft to the proper altitude for the direction in which it is flying.

Figure 3:
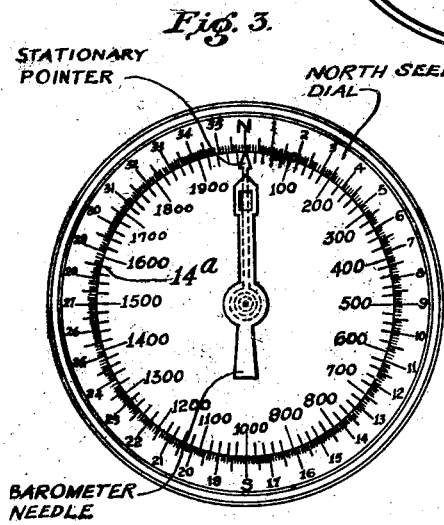
Fig. 3 is a view of a modified form of indicator generally similar to the arrangement shown in Fig. 1 excepting that in the structure shown in Fig. 3 the dial having degree indications thereon moves with the north-seeking member while the compass indicator is fixed to move with the air-craft.

Although the invention has been described as applying to horizontal and side reading indicators, it is to be understood that the invention is also applicable to other types of indicators, for example, the gyroscopic type, or the remote control type. Furthermore, in lieu of the north seeking needle and fixed dial, the invention is also applicable to an indicator having a north seeking dial and a fixed needle, in which latter instance the notation of the respective graduations and degrees would require to be reversed where necessary, from an anti-clockwise to a clockwise direction. Such an indicator is shown in Fig. 3.

I claim:

1. A directional flight level indicating instrument comprising a dial having indicated direction degree readings circumferentially disposed thereon and associated with a north seeking needle adapted to indicate on the degree readings the direction in which an air-craft is flying, an independent needle axially disposed in relation to the north seeking needle and operable by variations in barometric pressures, the said barometrically operated needle being arranged to make one complete revolution around the dial over an adopted standard change of altitude whereby the altitude of the air-craft in relation to its flying direction is determined by maintaining the barometrically operated needle and the north seeking needle in a superimposed position, for the purposes specified.

2. A directional flight level indicating instrument having two axially mounted circular side reading dials horizontally disposed, one dial being controlled by a north seeking element, the other dial being operable by variations in barometric pressures to make one complete revolution over a predetermined change of altitude, the said dials being revolvable independently of one another, indicated degree readings vertically located on the peripheral face of the north seeking dial, and indicated degree readings located on the peripheral face of the barometrically controlled dial, a lubber line fixed to the instrument face and for use in conjunction with the degree readings of the north seeking dial and of the barometrically controlled dial to denote the direction in which an air-craft is flying, all for the purposes specified.

3. A directional flight level indicating instrument for use with air-craft comprising a revolvable north seeking dial having directional degree readings circumferentially disposed in a clockwise manner thereon, an axially disposed needle associated with said readings and fixed in relation to the air-craft, an independently revolvable needle responsive to variations in barometric pressures, the said latter needle being adapted to make one complete revolution around the north seeking dial over an adopted standard change of altitude, and to move in unison with the revolvable north seeking dial, the said needle, when maintained in a predetermined position relative to said dial, indicating that the aircraft is at the correct altitude in accordance with the direction in which it is flying, all for the purposes specified.

4. A directional flight level indicating instrument for use with air-craft, comprising a revolvable north-seeking element, a stationary member cooperating with said revolvable element so that the position of said revolvable element relative to said stationary element indicates the direction of flight, an independently revolvable element adapted to be operated by variations in barometric pressure and mounted for rotation on the same axis, with the first said revolvable element, said independently revolvable element being adapted to make one complete revolution over an adopted change of standard altitude, and to remain fixed relative to the first said revolvable element when the air-craft is at a predetermined correct altitude in accordance with the direction in which it is flying, all for the purposes specified.

5. A directional flight level indicating instrument for aircraft including means adapted to be operated by a change of direction and means adapted to be operated by a change of altitude, characterized by both said means being mounted for movement about a common axis to indicate by a single relative position of both said means to each other when an aircraft in which the instrument is fitted is flying at a correct flight level relative to the direction of travel to prevent collision of aircraft flying in different directions.

6. A directional flight level indicating instrument for aircraft including an altitude indicating element, an element adapted to be operated by a change of direction of flight, and a direction indicating means, characterized by both said elements being mounted for movement about a common axis to indicate by a single position relative to each other and their common position relative to said indicating means when an aircraft is flying at a correct flight level relative to any certain direction of travel to prevent collision of aircraft flying in different directions.

7. A directional flight level indicating instrument for aircraft comprising means adapted to be operated by a change of direction, means adapted to be operated by a change of altitude, both said means being coaxial but rotatable independently of each other, and being arranged so that they are in registry with each other when an aircraft in which the instrument is fitted is flying at a correct flight level in any direction.

8. A directional flight level indicating instrument comprising a dial having indicated altitude graduations circumferentially disposed thereon with adjacently disposed indicated degree readings located in defined relationship to the said altitude graduations, means adapted to be operated by changes in the barometric pressure associated with said graduations and readings and adapted to make one complete revolution around the dial when the aircraft moves from one predetermined altitude to another, and a north seeking element mounted for rotation about an axis common to the axis of said barometric pressure operated means, said north seeking element, said barometric pressure operated means and said degree readings, and altitude graduations assuming a single relative position when the aircraft is flying at the altitude which is proper for the direction of flight.

BASIL WILLIAM HENRY COCKS.